March 20, 1962 F. A. RODMAN ET AL 3,025,749
INSPECTION DEVICE FOR GLASS SHEETS
Filed Jan. 15, 1959
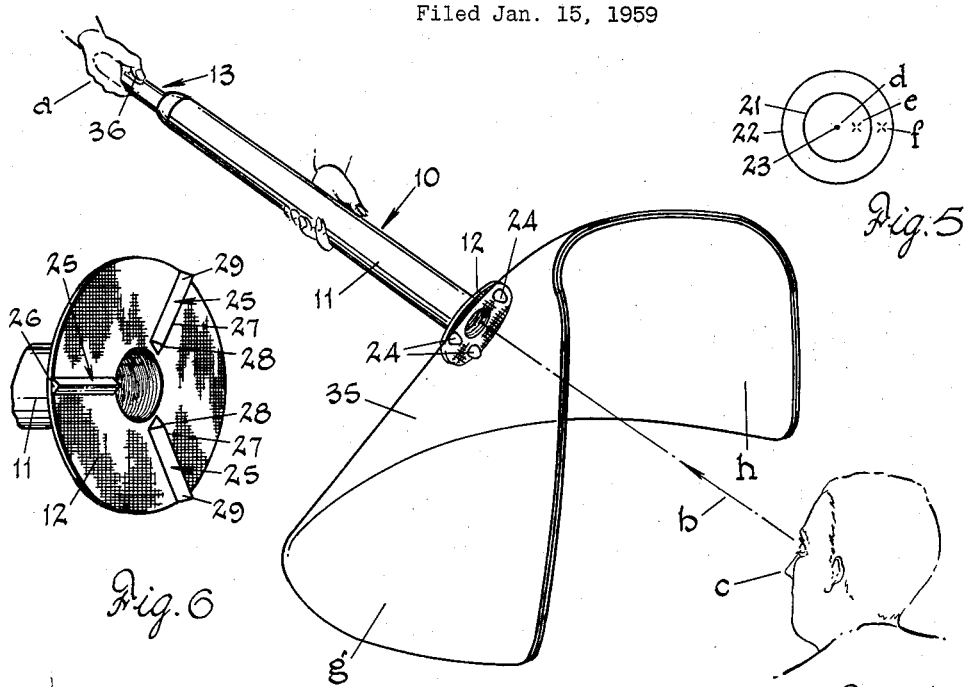
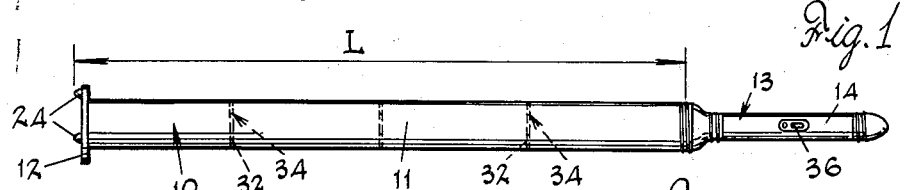
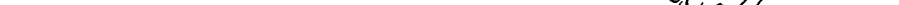
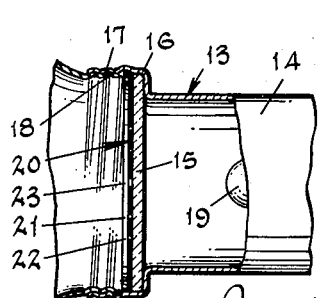
INVENTORS
Frank A. Rodman and
BY John R. Ermlich
Nobbe & Swope
ATTORNEYS

United States Patent Office 3,025,749
Patented Mar. 20, 1962

3,025,749
INSPECTION DEVICE FOR GLASS SHEETS
Frank A. Rodman, Toledo, and John R. Ermlich, Perrysburg, Ohio, assignors to Libbey-Owens-Ford Glass Company, Toledo, Ohio, a corporation of Ohio
Filed Jan. 15, 1959, Ser. No. 786,962
9 Claims. (Cl. 88—14)

The present invention relates broadly to the inspection of glass sheets or plates and more particularly to an improved inspection device for determining the presence of optical distortion in laminated glass sheet assemblies.

The existence of optical deviations has long been recognized in the manufacture of flat glass as a condition that is usually not readily apparent to casual observation. This stems from the fact that such deviations may be located in randomly located areas of a glass sheet not ordinarily disposed in a direct viewing area. One common source of deviation is known as "wedge" which occurs when the surfaces of a glass sheet are not in exact parallelism with one another. Within an acceptable magnitude of angle, this deviation is not normally sufficient to cause concern or the rejection of a finished article, such as a glass sheet or a laminated safety glass window or windshield. However, when an object being viewed through a windshield is a bright light source, such as the headlight of an approaching automobile, seen against a dark background, the presence of any existent wedge in the windshield may become quite apparent. In such a situation, the area of the glass sheet exhibiting a condition of this character causes a ghost image of the bright light source to appear which is displaced from the actual light source a distance that varies according to the slight angular or deviating relationship existing between the glass surfaces. This phenomenon is also sometimes apparent under daylight conditions but at such times ordinarily does not constitute an optical problem.

The appearance of the ghost image may be produced by light rays which, after entering the front surface of a glass sheet, are reflected first from the back surface and then from the front surface and emerge through the back surface. In the case of laminated safety glass, which is made up of two or more sheets of glass and at least one interlayer of plastic material, the possibility for wedge is increased, or in variations in thickness in the plastic interlayer material or as produced during the laminating process.

One practical approach to determining the amount of "wedge" in flat glass sheets is disclosed in the patent to McMaster et al., Serial No. 2,735,331. Apparatus of this character may be employed to automatically examine individual flat sheets of glass preparatory to lamination and enables the sorting out of the sheets exhibiting "wedge" in which the surfaces deviate from parallelism beyond the granted tolerance. However, to insure production of optically suitable glass and especially of laminated glass units, further inspections are required to make certain that the finished articles are within the required limits of specified tolerance which results in improved ease of viewing and clarity. Even with this maintenance of stringent inspection, it has been found that glass sheets heretofore considered acceptable may exhibit objectional wedge or deviation areas when the sheets have been bent and laminated to form a curved windshield and installed in an automobile. When installed in an automobile, it has been impracticable to examine the windshields for "wedge" with inspection apparatus heretofore available.

An important object of this invention therefore is to provide a manually operable device for inspecting bent glass sheets and which is of particular utility in inspecting curved laminated windshields or windows.

Another object of the invention is to provide a portable inspection device of the above character wherein means is provided to form a spot of light against a dark background to show any areas exhibiting wedge or deviation.

Another object of the invention is to provide a portable inspection device of the above character wherein means is provided for supporting the same upon a surface of the glass sheet to be inspected in a position approximately perpendicular to said surface.

A further object of the invention is to provide a portable inspection device wherein a supporting means is included to mount the same upon a surface of the glass sheet to be inspected, said means being adapted to readily indicate when the said device is not placed in an approximately perpendicular position.

Other objects and advantages of the invention will become more apparent during the course of the following description when read in connection with the accompanying drawings.

In the drawings, wherein like numerals are employed to designate like parts throughout the same:

FIG. 1 is a perspective view of the inspection device of this invention in one normal position of use;

FIG. 2 is a side elevational view of the device;

FIG. 3 is a front end view;

FIG. 4 is a vertical sectional view as taken on line 4—4 of FIG. 3;

FIG. 5 is a graphic view showing the operation of the inspection device; and

FIG. 6 is an alternate form of support for the inspection device.

Referring more particularly to the drawings, there is disclosed in FIGS. 1 and 2, an inspection device constructed in accordance with the invention and designated in its entirety by the numeral 10. The inspection device 10 is comprised of a tubular sighting element 11 which is provided at one end with a base flange 12 and at its opposite end has fixedly attached thereto a source of illumination, as for example, a conventional-type battery powered flashlight 13.

As best seen in FIG. 4, the forward end of the light source or flashlight case 14 is adapted to carry a transparent support or screen 15, as of glass, and is provided with a tubular extension 16 having threads 17 formed therein. The adjacent end of the tube 11 is similarly provided with threads 18 whereby the tube can be threadably secured to the casing of the light source or flashlight 13. This fixed relation may also operate to maintain the support 15 in suitably mounted relation to the bulb 19 of the flashlight.

For the novel purpose to be hereinafter more fully described, the transparent support or screen 15 is coated or suitably covered with a light-impervious layer 20 which may be applied by stenciling or by an adhered layer of paper or like materials. While not limited to any particular color, the coating or covering is indicated as of a dark color and preferably black. The coating is removed, omitted or deleted to define a pair of light transmitting paths or bands 21 and 22 which may be of any desired outline and, as herein shown by way of example, are circular and concentrically arranged with respect to a centrally disposed light aperture 23 as shown in FIG. 5. The circles 21 and 22 are substantially transparent or translucent and are tinted a light color, such as green or blue, so that when subjected to light from the bulb 19 will contrast with the yellow or white rays of light emanating from the aperture 23. The diameters of the circles 21 and 22 as illustrated in FIG. 3 are substantially full size and are in generally exact proportion to the circles ordinarily employed for such inspection purposes.

While for purposes of illustration, the light bands 21 and 22 are shown and described as being of circular outline, it is also contemplated that for certain types of inspection of a more precision nature, the bands may be formed in the outline of other contours of a more geometric pattern such as squares or hexagons. This has been found to be advantageous when those making the inspection need to obtain a more definite relation between the light source and the ghost image thereof. Accordingly, when outlines, other than circular, are employed, the position of the ghost image can more or less accurately be determined in relation to a vertical or horizontal axial plane. And while it has heretofore been described that the outlines of the light bands can be established as by stenciling or by a layer of light-impervious material, it is also conceivable that the same can be obtained by the use of a reticle of a thin metal in which the outlines of the light bands are produced as arcuate, or otherwise shaped, slots, or by the use of network of fine wires. A screen of this nature will then be covered on one side or the other with a transparent film of suitable color.

When using the inspection device on the surface of a laminated glass article, such as a curved windshield, the same is adapted to be supported by means of buttons or feet 24 on the base flange 12 which are of a relatively soft or non-abrasive material as a molded plastic. The feet 24 are preferably arranged, as shown in FIG. 3, to provide a tripod form of support when the device 10 is in use. This will afford a relatively stable amount for the inspection device and will insure that the longitudinal axis of the tubular sighting element 11 will be normal or perpendicular to the surface of the glass sheet in the area to be examined.

This becomes more apparent when the inspection device 10 is employed to check areas of a bent laminated glass windshield that contains relatively shallow and/or sharply curved surfaces. Such conditions are found in the sharply curving areas between the relatively shallow central curvature of a windshield and the end or wing areas that blend into the contours of the sides of the automobile body. However, when the inspection is shifted to, or is to be carried out, in an area of shallow curvature, such as the central area of a windshield, or on planular surfaces, it has been found that a form of support for the tubular sighting member 11 may be employed which will similarly mount the inspection device perpendicular with respect to the surface being inspected.

For this purpose, the base flange 12 is increased in diameter and, as illustrated in FIG. 6, is equipped with bars 25 of the same material as the feet 24. Preferably, the bars 25 are substantially triangular in end elevation whereby a flat mounting or securing base 26 is provided and a "knife-edge" surface 27 is afforded. The bars 25 are arranged in radially spaced position to establish a "tripod" type of support when the device 10 is placed upon the surface of a sheet to be inspected. However, the bars 25 are arranged to project radially farther outwardly from the longitudinal axis of the sighting element 11 and consequently any tilted position and angular displacement from the perpendicular plane will become more readily apparent. Thus, while the inner ends 28 of the bars 25 will provide a form of support for inspecting curved surfaces, similar to that rendered by the feet 24, the more outwardly disposed portions of the "knife-edge" surfaces 27 toward the extreme ends 29 will provide a greater area of contact on planular surfaces or those containing a shallow curvature. Consequently, when inspections are to be made on surfaces of either shallow curvature or flat characteristics, any tendency for placing the sighting element 11 in any position other than substantially perpendicular to the surface to be checked will be reduced by the more stable support offered by the length of the several bars 25. Likewise, when a slightly tilted position may be encountered, the radial disposition of the legs 25 will influence a noticeable rocking action of the inspection device which otherwise would not occur or be apparent.

In order that visual disturbances will not be encountered while an inspection is being made, the "facing" surface of the flange 12 and the inner surface of the tubular sighting element 11 are provided with dull or "matted" surfaces that are preferably of the same dark color as the background or "field" of the support 15. While this general appearance is not specifically indicated throughout the figures of the drawing, it will be appreciated that, as viewed in FIG. 3, the areas of the flange surface 30 and the surface 31 of the mounting end of the light case 14 will accordingly have the same appearance as the area indicated by the numeral 20. Additionally, any extraneous beams of light which might appear as spurious reflections along the inner surface of the sighting element are overcome by the provision of light baffles 32 which may be arranged along the length thereof as indicated in FIG. 2. These baffles, as partially shown in FIG. 3, have an enlarged central aperture 34 so that neither viewing of the light bands 21 and 22 nor the appearance of a ghost image in relation to the light beam from the central aperture will be interfered with. The outwardly directed surfaces of the baffles as well are provided with a dull surface.

While no restrictive scope of use is to be herein implied, the inspection device 10 has been found to have particular utility when employed for testing curvedly bent glass sheets such as laminated bent windshields as illustrated in FIG. 1. The windshield 35 may thus be in its installed position in an automobile or suitably supported on a bench or table in a simulated installed position. Now, an inspector as indicated at $a$, by gripping the tubular sighting element 11 in one hand and the light case 14 in the other, places the device against the outer surface of the windshield and with the device perpendicular to said surface. When the bulb 19 is illuminated upon use of the switch button 36, the light ray along the line $b$ will appear through the aperture 23. Likewise, the concentrically arranged circles 21 and 22 will be illuminated as light bands of contrasting color toward an inspector, indicated at $c$, either seated within the automobile or similarly positioned with reference to the windshield.

Referring now to FIG. 5, a ghost image of the light ray $d$ may be seen at positions, such as $e$ or $f$, depending upon the existence of wedge or deviation from parallelism between the oppositely disposed, outer surfaces of the composited glass sheets of the laminated windshield. In the event that the driver's side $g$ of the windshield is being examined in any or all areas, the appearance of such a ghost image $e$ within the bounds of the circle 21 will indicate that the presence of wedge is within an acceptable range of tolerance. It should be herein noted that this so-called range of tolerance may be one established for manufacturing purposes, one that is made as a requirement of the user or one set up as a requirement to be generally conformed to. As pointed out above, the appearance of the ghost image may be produced by light rays which, after entering the front surface of a glass sheet, are reflected first from the back surface and then from the front surface and emerge through the back surface.

However, when use of the inspection device is transferred to the passenger's side $h$ of the automobile, the occurrence of a ghost image, as indicated by the letter $f$ and within the area defined by the circle 22, will indicate that any area in this side of the windshield is within the permitted range of tolerance. On the other hand, when the spot or ghost image $e$ appears between the light bands 21 and 22, any deviation of the sheet surfaces from parallelism will indicate that the particular area is not within the permitted tolerance on the left or driver's side of the windshield. Also, the appearance of ghost image $f$ outside of the circle or light band 22 will indicate any wedge or deviations in the right side of the windshield in the same manner.

In accordance with the certain requirements or specified tolerances, the ghost image of a light source, established at a distance of twenty-five feet during one typical manner of inspection and from the glass sheet to be inspected, must appear within the bounds defined by a predetermined outline, such a circle of predetermined diameter concentric with said light source and illuminated thereby. To establish a tolerance range of permissible wedge or deviations in a solid or laminated glass sheet, the number of circles and diameter or diameters of one or more related circles is determined in proportionate relation to the above-mentioned distance of twenty-five feet and preferably a plurality of such arranged outlines of differing dimension are employed depending upon the area of the glass sheet, such as a laminated windshield, to be inspected. Thus, location or appearance of a ghost image within a circle of four inches will denote either the absence of wedge or the presence thereof within the permitted tolerance in areas on the left or driver's side of a windshield as viewed from the interior of an automobile. Likewise, and since the presence of wedge is not as critical on the right or passenger side, the appearance of an image within the bounds of a circle of six inches diameter is not considered critical. However, if the location of the ghost image of the light ray is outside of the four inch diameter circle, in the first instance, or outside the six inch diameter circle, in the second instance, the windshield will not be considered within the tolerances permitted by certain specifications.

Accordingly in this invention, the length of tube 11 and diameters of the circles 21 and 22 are proportioned to similar dimensions, as above set forth, so that when a suitable length for the tubular sighting element 11 from the feet 24 on the flange 12 to the transparent support or screen 15 has been determined, the diameters of the circles 21 and 22 can be established. Thus, by way of example, which is not to be taken restrictive to the invention, when the length of the tubular element 11, indicated at L in FIG. 2, is three and one-eighth feet, then the circle 21 will be one-half inch in diameter and the circle 22 three-quarters of an inch in diameter.

While a preferred use of the inspection device of this invention has been hereinabove described, it is believed apparent that by reason of the fact the device is relatively light in weight and is self-powered, either by small batteries or by an ordinary low-power electric bulb connected to a suitable source of current, it can be easily used in positions heretofore considered impracticable for the convenient use of larger and more or less cumbersome forms of equipment. Thus, inspection of glass sheets, and particularly those of bent laminated windshields, can be made either before or after the windshield has been installed in an automobile. Likewise, when replacement of a windshield becomes necessary, an inspection device in the hands of the supplier will assure both he and the customer that the substituted windshield will be free of objectional deviation or wedge and as prescribed by the known tolerances.

It is to be understood that the forms of the invention herewith shown and described are to be taken as preferred embodiments of the same, but that various changes in the shape, size and arrangement of parts may be resorted to without departing from the spirit of the invention or the scope of the subjoined claims.

We claim:

1. An inspection device for checking deviation between the surfaces of glass sheets, comprising a tubular member open at one end, a transparent screen located at the opposite end of said tubular member, a light-impervious coating on one surface of the screen having a centrally disposed aperture and at least one circular light-pervious band concentric with said aperture and of a color contrasting with the color of the coating on said screen, and means for directing a light ray through said aperture and for illuminating the circular band, whereby when the open end of the tubular member is placed against one surface of a glass sheet to be inspected the extent of deviation between the surfaces of said sheet will become apparent when viewed from the opposite surface of the glass sheet as indicated by the position of a ghost image of the light ray in relation to said circular band.

2. An inspection device as defined in claim 1, wherein a plurality of circular light-pervious bands are arranged in concentric relation to one another and to the said aperture and in which the said bands are of a lighter color than the color of the coating on said screen.

3. An inspection device as defined in claim 1, wherein the open end of the tubular member is provided with a supporting flange extending at right angles to the longitudinal axis of the tubular member and in which non-abrasive glass sheet engaging elements are carried by said flange.

4. An inspection device as defined in claim 1, wherein means is interposed between the open end of the tubular member and the light directing means to reduce spurious reflections therebetween.

5. An inspection device as defined in claim 4, wherein the last-named means includes a plurality of baffle elements having aligned openings therein.

6. An inspection device as defined in claim 3, wherein the sheet engaging elements are arranged in equally spaced radially disposed relation to the longitudinal axis of the tubular element.

7. An inspection device as defined in claim 3, wherein the sheet engaging elements are elongated bars with converging surfaces to provide knife-edge mounting portions for the said tubular element.

8. An inspection device as defined in claim 7, wherein baffle means is interposed between the open end of the tubular member and the light directing means to reduce spurious reflections therebetween and the visible surfaces of the inspection device and the screen therein are of substantially the same color.

9. An inspection device as defined in claim 1, wherein the last-named means includes an enclosed light source carried at the opposite end of the tubular member.

References Cited in the file of this patent

UNITED STATES PATENTS

| | | |
|---|---|---|
| 1,756,785 | Gallasch | Apr. 29, 1930 |
| 2,253,054 | Tuttle et al. | Aug. 19, 1941 |
| 2,379,263 | Vine | June 26, 1945 |
| 2,735,331 | McMaster et al. | Feb. 21, 1956 |
| 2,764,058 | Ellis | Sept. 25, 1956 |